(12) United States Patent
Balandier

(10) Patent No.: US 11,788,467 B2
(45) Date of Patent: Oct. 17, 2023

(54) BLADED ROTOR WHEEL

(71) Applicant: ITP ENGINES UK LTD, Whetstone (GB)

(72) Inventor: Quentin Luc Balandier, Leicester (GB)

(73) Assignee: ITP ENGINES UK LTD, Whetstone (GB)

(*) Notice: Subject to any disclaimer, the term of this patent is extended or adjusted under 35 U.S.C. 154(b) by 111 days.

(21) Appl. No.: 17/345,856

(22) Filed: Jun. 11, 2021

(65) Prior Publication Data

US 2021/0396179 A1 Dec. 23, 2021

(30) Foreign Application Priority Data

Jun. 19, 2020 (EP) ................................. 20181050

(51) Int. Cl.
*F02C 7/12* (2006.01)
*F01D 5/02* (2006.01)
*F01D 5/18* (2006.01)

(52) U.S. Cl.
CPC .............. *F02C 7/12* (2013.01); *F01D 5/022* (2013.01); *F01D 5/18* (2013.01); *F05D 2220/323* (2013.01); *F05D 2230/21* (2013.01)

(58) Field of Classification Search
CPC . F01D 5/18; F01D 5/186; F01D 5/187; F01D 5/34
See application file for complete search history.

(56) References Cited

U.S. PATENT DOCUMENTS

| | | | | |
|---|---|---|---|---|
| 9,903,214 | B2* | 2/2018 | Kenyon | ............... B23K 26/342 |
| 2016/0146024 | A1* | 5/2016 | Morris | .................. B23P 15/006 |
| | | | | 228/104 |
| 2016/0339516 | A1* | 11/2016 | Xu | .......................... C30B 11/00 |
| 2018/0230831 | A1 | 8/2018 | Kush et al. | |

FOREIGN PATENT DOCUMENTS

EP 3486430 A1 5/2019

OTHER PUBLICATIONS

European Search Report for European Patent Application No. EP20181050, dated Nov. 13, 2020, in 3 pages.

* cited by examiner

*Primary Examiner* — Woody A Lee, Jr.
*Assistant Examiner* — Cameron A Corday
(74) *Attorney, Agent, or Firm* — Knobbe, Martens, Olson & Bear LLP

(57) ABSTRACT

A bladed rotor wheel of an aero turbine stage includes a portion of a rotor blade with a shank portion and a bottom surface; a portion of a forged rotor disk with a rim portion and an outer surface; and a joining structure provided by an additive manufacturing process configured for integrally merging the portion of a rotor blade with the portion of a forged rotor disk. An aero turbine can include such bladed rotor wheel, and an aircraft can include such aero turbine.

16 Claims, 5 Drawing Sheets

BLADED ROTOR WHEEL

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

TECHNICAL FIELD

The present disclosure belongs to the field of gas turbines, used in aero engines for aircraft propulsion. In particular, the disclosure relates to the integration of high temperature rotor components by means of additive manufacturing.

BACKGROUND

Aero engines are made of a gas turbine, which develops a Brayton thermodynamic cycle. In such cycle, air runs through a compressor, a combustion chamber and a turbine. The maximum temperature reached in the combustion chamber determines the efficiency and maximum power of the thermodynamic cycle. Therefore, one of the main lines of research in aero engines development aims at designing systems, which increase the temperature of the combustion process and the resulting temperature at the turbine first stage.

In recent aero engines, the temperature at which the air exiting the combustion chamber enters the first stage of the turbine may be up to 1700° C. (air temperature). A complex cooling system is therefore required to prevent the turbines vanes and blades operating at metal temperatures above their melting point.

Furthermore, $1^{st}$ stage turbine blades are subjected to gas pressures, centrifugal loads and temperatures that induce high stresses, both mechanical and thermal, as well as potentially high vibrations. All these factors may cause fatigue or creep failures of the blades. The design of the first turbine stage blade is thus regarded as one of the most challenging design point for gas turbines technology.

In addition, the design of the disk carrying the blade is also difficult, mainly due to the fact that a disk—unlike a blade—is classified as a critical part. Its failure could not be contained by the engine casing and would lead to the release of hazardous debris, potentially damaging the airframe.

In this context, the blade and the disk of the high pressure turbine stage (i.e. first stage turbine blade and disk assembly) has received the highest attention during the latest aero-engines' developments. The capacity to run at increasingly high gas temperatures has resulted from a combination of material improvements and the design of more sophisticated arrangements for internal and external cooling. Some examples of technology developments for dealing with the extreme turbine conditions may comprise:

High Temperature Materials Showing High Performance in Extreme Environments.

These materials have high tensile strength, creep strength, corrosion and oxidation resistance at high temperatures. Examples of materials used in the manufacturing of turbine blades and disks are Nickel based superalloys.

The specific requirements for blades and disks materials are different. For example, a turbine blade—directly exposed to hot gases—requires predominantly a high creep strength combined with high corrosion and/or oxidation resistance. A disk requires predominantly a high tensile strength and good fatigue properties to prevent its hazardous burst in service. Additionally, the blade is cast, whereas the disk is forged in the present state of the art of aero-engine first stage turbines.

These different requirements result in different chemical compositions in blades and disks. For example, a first stage turbine blade can be made out of CMSX4®, which is capable of operating at metal temperatures above 1150° C. CMSX4® is a nickel based alloy, containing Rhenium to improve the creep strength of the blade. Its composition is: Cr (6.5 wt %), Co (9.6 wt %), W (wt 6.4%), Re (wt 3%), Mo (wt 0.6%), Al (wt 5.6%), Ti (wt 1.0%), Ta (wt 6.5%), Hf (wt 0.1), Ni (balance).

By contrast, the composition of the alloy RR1000® used in the disks of some recent aero engines is: Cr (14.35-15.15 wt %), Co (14-19 wt %), Al (2.85-3.15 wt %), Ti (3.45-4.15 wt %), Mo (4.25-5.25 wt %), C (0.012-0.33 wt %), B (0.01-0.025 wt %), Zr (0.05-0.07 wt %), Hf (0-1 wt %), Ni (balance). The slight differences in the chemical compositions of the superalloy result in different mechanical properties and different forming and manufacturing capabilities (especially, forging or casting capabilities) adapted to the specific requirements of the component.

Improved Microstructure of Said Materials.

Several techniques such as solid solution strengthening, precipitation hardening, directional solidification or single crystal casting enable an increase in metal in-service temperatures. In the case of turbines blades, where creep strength is the main targeted attribute, directional solidification or single crystal casting produce one or few grains oriented in the direction of the blade centrifugal load. This greatly increases the creep resistance of the blade vs. a blade made from a multi-crystalline alloy. In addition, the casting process enables the production of cooling channels required for cooling of the first stage turbine blade.

In the case of turbine disks, where tensile strength and fatigue strength are the main targeted attributes, different methods of metal forging allowed to optimize the microstructure and the mechanical properties of the disk, increasing its temperature capability. High material grades of nickel based alloy, made from complex forging processes such as Net-Shape Hot Isostatic Pressing of powder alloys, have been developed and are now used in production. Such complex alloys have a higher temperature capability than the previous generations of nickel based alloys. Modern forging process are also tightly controlled to reduce the probability of occurrence and potential size of material defects in the body of the disk. This reduces the risk of defect propagation and hazardous disk burst in service to levels within regulatory requirements.

Optimization of Cooling Features

The design of the high pressure turbine blade provides several cooling features, such as internal cooling channels, wherein the turbine blades receive compressed air bled from the compressor which is injected to the turbine blades through holes located in the lower sections of the blade. Said cooling air bled from the compressor bypasses the combustor thanks to a secondary air-system parallel to the main gas path. It also establishes a protection layer on the blades, thus preventing direct contact with the hot gases from the main gas path (i.e. film cooling). Further, protective coatings, such as ceramic coatings, are often thermally deposited on metallic turbine blades.

Cooling channels can also be machined (i.e. drilled) in the forged turbine disk. However, this significantly compromises the integrity of the disk, as it creates a stress concentration feature and can lead to micro-burrs during drilling. This compromises the life of the disk and is therefore not preferable as the disk is classified as a critical part.

Blade and Disk Integration

Finally, a key area for the optimization of the performance of turbines is the integration of the blades and the disks in the different rotor stages. In gas turbine engines, blades are normally attached to disks with dovetail or firtree arrangements. In particular, in a turbine blade, an aerofoil is connected to a lower platform, a straight shank portion and a root portion in the bottom side of the blade, for engaging a portion of the peripheral part of the disk (generally called disk rim). Said root portion is shaped to be restrained from releasing radially by at least a pair of surfaces which make contact with the disk at respective opposite surfaces carved therein. In particular embodiments, dovetail attachments are sometimes in the form of single-tooth attachments. However, most of the current solutions for root portions in turbine arrangements include multiple pairs of contacting surfaces that contact multiple pairs of disk surfaces, respectively. This arrangement aims at reducing contact stresses by increasing the total contact area between the blade and the disk. However, due to space limitations, this arrangement creates sharp features and small radii with high stress concentrations. It compromises the life of both the turbine blade and the disk.

During operation, the contact surfaces may suffer from micro slips and vibrations, due to the reaction of the aerofoil gas loads. In this sense, cracks are often initiated in the attachment region at the blade-to-disk interface.

Therefore, recent developments are directed to improve the geometry and behavior of said firtree joints, such as the "crowning" of contact surfaces, to reduce the stress distribution at the joint interfaces and delay crack nucleation.

Despite the demanding manufacturing tolerances imposed for both blade and disk coupling features (i.e. firtree/dovetail structures, corresponding disc bucket grooves and locking plates assuring the axial retention of the blade relatively to the disc), gaps are present between components at the blade-to-disk interfaces, to allow manufacture and assembly, and to accommodate expansion and compression resulting from the thermal and centrifugal loads. These gaps may cause leaks and performance losses.

Additionally, due to the complexity of the interface between the blade and the disk and the complexity of the resulting secondary gas path, the transmission of cooling air from the compressor to the turbine blade is not optimal.

As a result, the current technical design approach in the gas turbine industry, focusing on structural integration of turbine blade-disk arrangements by means of firtree joints and lockplates, still impose a high penalty to the performance and efficiency of the turbine stage.

SUMMARY

The present disclosure provides an alternative solution for the aforementioned problems by providing a bladed rotor wheel according to claim 1, and an aero-engine turbine according to claim 15.

All the features described in this specification, including the claims, description and drawings, can be combined in any combination, with the exception of combinations of such mutually exclusive features. The dependent claims define preferred embodiments of the disclosure.

Along the entire document, reference shall be made to a number of particular terms for which a description will be now provided. Therefore, these terms must be construed as follows.

Additive Manufacturing (AM), also referred to as 3D printing, relates to current manufacturing methods and technologies wherein three-dimensional components are built up applying successive layers of material under computer control, departing from a digital model of the component to be produced. In particular, for complex components of an aero engine, alloys that can be used for 3D printing include, as examples, steel, nickel, or titanium based alloys. Further, examples of types of additive manufacturing techniques for producing aero-engine components include selective laser melting or sintering.

Since the first inventive aspect, this is, the bladed rotor wheel, and some embodiments of the disclosure relate to the integration between the blade and the disk of a turbine rotor stage by means of a 3D-printed transition zone which merges integrally said components, it shall be understood that the bladed rotor wheel comprise a rotor blade and a rotor disk. Therefore, the terms "portion of a rotor blade" and "portion of a forged rotor disk", shall be used so as to focus on the portion of said elements (i.e., the rotor blade and the disk) involved in the structural integration of the whole bladed rotor wheel of an aero-engine turbine stage.

Additionally, the person skilled in the art will understand that the bladed rotor wheel of the disclosure may comprise a plurality of rotor blades distributed uniformly at 360° over the whole ring area (i.e., rim portion) of the disk, said plurality of rotor blades being integrally merged with said ring area, by respective 3D-printed transition zones (i.e. joining structures).

In this sense, the bladed rotor wheel of an aero-engine turbine provided by the disclosure may be referred to as a "blisk". However, unlike known compressor blisks, wherein the whole component is machined from a solid block of material, the turbine "blisk" proposed by the present disclosure proposes major structural modifications and considerations.

In particular, in compressor arrangements, the environmental conditions are much gentler than in turbine arrangements. Especially, the maximum operating air temperatures are around 650° C., which result in far less restrictive requirements. As a result, compressor blisks are usually machined from medium temperature capability alloys such as Titanium or Steel. As a further example, since the components are not subjected to creep like turbine components are, the small grain sizes of the compressor blisks alloys do not limit the component life. No optimisation of the alloy microstructure—such as a single crystal or directionally solidified form—is required.

Further, cooling channels are not required in compressor blisks, resulting in much simpler, smaller and lighter aerofoil geometries. As internal cooling channels are absent in the compressor blisks, casting process is not required.

As a result, the compressor blisks can be directly machined from a single solid block of material. Because of its simple requirements, a compressor blisk has uniform grain sizes—and resulting mechanical attributes—in its blade and disks parts. No spatial optimisation of its attributes is required.

According to a first inventive aspect, the disclosure provides a bladed rotor wheel of an aero-engine turbine stage, the bladed rotor wheel comprising:

a portion of a rotor blade, provided by a casting process as a single crystal alloy or made from a directionally solidified alloy, the portion of a rotor blade comprising an aerofoil, a shank portion and a bottom surface, a portion of a forged rotor disk, said portion of a forged rotor disk comprising a rim portion and an outer surface, a joining structure provided by an additive manufacturing process and configured for integrally merging the portion of a rotor blade with the portion of a forged rotor disk, wherein, the bottom surface of the portion of a rotor blade abuts the rim portion of the portion of a forged rotor disk, the joining structure is merged with, an outer surface of the shank portion, the joining structure and the shank portion thus providing structural continuity through a joining interface formed between the joining structure and the portion of a rotor blade, and the outer surface of the portion of a forged rotor disk, thus providing structural continuity through a joining interface formed between the joining structure and the portion of a forged rotor disk, the joining structure comprises a first cooling channel shaped therein by the additive manufacturing process, said first cooling channel comprising an inlet and an outlet, the portion of a rotor blade comprises a second cooling channel shaped therein by the casting process, said second cooling channel comprising an inlet and an outlet, wherein, the first cooling channel and the second cooling channel are complementary, such that when the joining structure is merged with the outer surface of the rotor blade shank portion, the outlet of the first cooling channel matches with the inlet of the second cooling channel, thus providing fluidic communication between the first cooling channel and the second cooling channel through the joining interface.

In a turbine blisk arrangement according to the disclosure, a high tech cast blade is integrally merged with a forged disk by means of a joining structure provided by means of 3D printing, which serves as a transition zone. This forms a composite structure, with optimum mechanical attributes for each part of the blisk. The composite structure includes at least three different bodies, with different microstructures and mechanical properties.

Since the aerofoil is subjected to thermal and centrifugal loads, creep strength is the most restrictive requirement for rotor blades. Therefore, due to its good creep resistance properties, the portion of a turbine rotor blade is preferably cast from a single crystal or a directionally solidified alloy. Additionally, it is provided with a plurality of cooling channels, which are a mandatory requirement allowing the turbine aerofoil alloy to operate below its melting temperature.

In turn, the forging process provides the disk portion with high tensile strength as well as high fatigue strength and damage tolerance properties. Tight manufacturing controls reduces the probability of occurrence and size of defects in the body of the disk, preventing hazardous disk burst in service.

In a preferred embodiment, materials used in the manufacturing of turbine blades and disks may be Ni-based superalloys, such as CMSX4® or CMSX10® for the blade or U720®, RR1000® for the disk.

The compressed and heated working gas provided from the combustion chamber will be reacted by the different turbine aerofoils pressure and suction sides, thus inducing high moment loads in the junction between the blades and the rotor. Advantageously, those moment loads are reacted in the present arrangement by:

direct contact between the bottom surface of the rotor blade and the rim portion of the forged rotor disk, and by shear forces transmitted though the joining structure.

In this sense, the integration of elements by means of a joining structure provided by additive manufacturing according to the disclosure prevents the use of interlocking mechanisms, such as lockplates and firtree arrangements, between the bottom surface of the rotor blade and the rim portion of the forged rotor disk. Therefore, the drawbacks associated to the use of said arrangements are avoided.

As aforementioned, one of those drawbacks is the presence of gaps in the rim portion of the disk. Apart from eliminating those gaps by the suppression of said arrangements, the additive manufacturing process provides a joining structure, which closes all additional gaps that may initiate leakages, losses, induce vibration, or mechanical interferences derived from the presence of contact surfaces.

In this regard, conduction of compressed air bled from the compressor for cooling the rotor blades can be further improved, since the different channels conveying said compressed air towards the blade cooling channel inlet can be directly printed in the joining structure without the losses known in the current firtree arrangement.

Further, the joining structure provides mechanical continuity through the joining interfaces, thus contributing to transfer the loads between the blade portion and the disk portion, bypassing said load, and helping to reduce stresses in said blade and disk portions by increasing the extent of the transition surface, which bridges the loads between them.

Regarding the nature of the stresses originated, since the joining structure is mainly outside of the centrifugal load path, it helps to turn the high tensile stresses of the blade into shear stresses. In this sense, upon the event of origination of a defect in the joining structure, since its propagation is less likely to occur under shear stresses rather than under tensile stresses, the probability of defect propagation in the 3D-printed structure is reduced.

Additionally, the joining structure can be provided as a cover with aerodynamic properties. This is, the external surface may provide the bladed rotor wheel with a smooth transition between the part of the blade, which receives the stream of compressed and cooling air and the disk, thus reducing potential windage effects between the rotor and the surrounding static components.

In a particular embodiment, the lower end radius of the joining structure is higher than 80% of the radius of the disk forging. Qualitatively, the joining structure covers the utmost external part of the disk forging only. This facilitates the repair of the blisk. For example, if a blade aerofoil is damaged during service operation, the joining structure and the external part of the disk forging (i.e. rim) can be machined off with simple machining operations such as milling. New blades with slightly longer shanks and a new joining structure can be applied—in conjunction with the original disk forging—to create a new blisk. The re-use of the original disc forging reduces costs.

In a particular embodiment, the bladed rotor wheel further comprises a second portion of a rotor blade provided by a casting process as a single crystal alloy or made from a directionally solidified alloy, said second portion of a rotor blade comprising a third cooling channel shaped therein by the casting process, wherein the third cooling channel comprises an inlet and an outlet, wherein the first cooling channel is divided downstream of the inlet into at least two cooling sub-channels, each of said cooling sub-channels comprising a respective outlet, one being configured for matching with the inlet of the second cooling channel, and the other being configured for matching with the inlet of the third cooling channel.

In a preferred embodiment, the cooling sub-channels axes are positioned in the same circumferential direction relatively to the inlet axis, so that the rotor rotation contributes to improving the flow of cooling air inward and downstream of the channels. In other words, the cooling sub-channels are positioned on the same side, with respect to the rotor rotation direction, vs. the first cooling channel. In the alternative case of sub-channels positioned on each side of the inlet channel, a sub-channel cooling flow would have a significantly higher resistance than the other sub-channel, the higher resistance being generated by a contra-rotating swirl flow direction, requiring additional work (i.e. pumping) to push the air.

In a particular embodiment, the inlet of the first cooling channel is provided with at least one geometric element configured for increasing the grip of the cooling air flowing inwards, the at least one geometric element being selected from the following:
  a hole angled with respect to the bladed rotor wheel rotation direction;
  a stepped discontinuity of the joining structure proximal surfaces surrounding the inlet; or
  a curved protrusion, preferably in the form of an aerodynamic guide vane.

These local features positioned at the channel inlet facilitate the introduction of the cooling air into the cooling channel.

In a particular embodiment, the material used for manufacturing the joining structure by the additive manufacturing process has a lower static strength (ultimate and/or proof strength) than:
  the material used for manufacturing the portion of a rotor bade by casting; and
  the material used for manufacturing the portion of a forged rotor disk.

In the present state of the art, 3D printing can produce material anomalies. In the turbine blisk of the disclosure, the 3D-printed structure is designed to be subjected, during operation, to relatively low stress levels in comparison to the stress levels experienced by the blade and the disk. As a result, the 3D printed structure can be made form a relatively soft material when compared with the materials used for manufacturing the blade and the disk.

In particular, since 3D-printing processes obtain lower defect rates with such "soft" materials (i.e. with lower static strengths), the probability of producing defects during the 3D printing process of the joining interface of the disclosure is significantly reduced.

In addition to reducing the stresses levels and changing the type of stresses, since the joining structure is preferably made from a material softer than that of the blade or the disk any fatigue crack in the bladed rotor wheel is first originated in the joining structure rather than in the critical areas (i.e. the blade and the disk).

In a preferred embodiment, at least one of:
  the joining interface formed between the joining structure and the portion of a rotor blade, and
  the joining interface formed between the joining structure and the portion of a forged rotor disk,
is comprised in a plane whose normal direction is parallel to the axis of the forged rotor disk.

The person skilled in the art will understand that the main longitudinal direction in an aero-engine turbine corresponds to the direction of the rotor axis. The plurality of rotor disks rims (i.e. area of the disk close to its outer diameter) comprise two parallel faces which are comprised in respective parallel planes which are thus perpendicular to the direction of the rotor axis. Accordingly, the normal direction of the planes containing the faces of the rotor disk is also parallel to the direction of the rotor axis and, therefore, perpendicular to the direction of the centrifugal force acting on the blade.

Therefore, according to this preferred embodiment of the disclosure, although the blades are subjected to high centrifugal loads, the interfaces between the joining structure, the blade and the disk will undergo shear stresses rather than tensile stresses. Advantageously, according to this configuration, the joining interfaces are not subjected to decohesive stresses.

In a preferred embodiment, at least one of:
  the thickness of the portion of the joining structure merged with the portion of a rotor blade through the joining interface, and
  the thickness of the portion of the joining structure merged with the portion of a forged rotor disk through the joining interface,
is less than 10 mm.

Advantageously, for the given value of thickness, Non-destructive testing (NDT) inspection techniques have an optimal performance, resulting in better defect detection capabilities of any material anomalies in the 3D-printed joining structure.

In a particular embodiment, the portion of a rotor blade further comprises a platform portion provided by an additive manufacturing process.

In essence, the platform of a turbine blade is a wall, which extends from the lower section of the blade aerofoil, transversely to its main longitudinal direction, so as to abut respective adjacent platforms of contiguous blades. As a result, the plurality of platforms complete the annular shape of a turbine rotor arrangement and define the lower interface of the turbine main gas path.

Advantageously, since blade platforms are not subjected to high centrifugal loads, such as the blade aerofoil, which would force to use high creep resistance materials and directional casting process, the small grain of additive manufacturing techniques has advantageous effects. In particular, the platform/aerofoil transition area is provided with better grain boundaries than in the current state of the art, which reduces the chance of originating grain defects. In the current state of the art, using single crystal or directional solidification casting, the transition area between the aerofoil and the platform can produce material defects due to the rapid change (i.e. discontinuity) of the elongated grains form.

Further advantageously, the manufacturing process is less resource and cost demanding as only the elongated aerofoil will be cast by directional solidification or single crystal casting. This improves the yield (i.e. reduces rejection rates) of the complex casting process, by casting of a simplified and smaller geometry.

In a particular embodiment, the platform portion comprises a joint configured for engaging with an adjacent joint comprised in a platform portion of an adjacent rotor blade, the joint being provided by an additive manufacturing process.

In a particular embodiment, the outer surface of the shank portion of the portion of a rotor blade comprises a positioning means for the additive manufacturing build-up process of the joining structure, the positioning means comprising at least one of the following:
- a protrusion cast with the portion of a rotor blade;
- a protrusion provided onto the portion of a rotor blade by an additive manufacturing process; or
- a plug component added to the casting of the portion of a rotor blade, the plug protruding from the outer surface of the shank portion.

These positioning means arranged in the outer surface of the shank portion of the portion of the rotor blade are configured to guide the connection between the portion of the rotor blade and the joining structure when merging the joining structure with said portion of the rotor blade. That is, the presence of these positioning means support the additive manufacturing build-up process of the joining structure, especially around the inlet of the second cooling channel present in the portion of a rotor blade. Therefore, these positioning means advantageously provide an improved fluid continuity between the first cooling channel of the joining structure and the second cooling channel of the portion of the rotor blade.

In a preferred embodiment, the positioning means are 3D-printed directly onto the cast blade, this is, on the outer surface of the shank portion of the portion of a rotor blade. In a more preferred embodiment, the position means provided directly onto the cast blade by an additive manufacturing process have the shape of a cone.

In a particular embodiment, the joining structure comprises at least one reinforcing rib provided by an additive manufacturing process, the at least one reinforcing rib being disposed along a radial direction of the bladed rotor wheel.

Accordingly, such reinforcing ribs disposed along a radial direction (i.e., radial reinforcing ribs) bears mainly tensile or compressive loads when the aerofoil undergoes centrifugal or bending loads.

Advantageously, a joining structure comprising reinforcing ribs provided by additive manufacturing according to the disclosure show a better structural behaviour in the direction of printing of the reinforcing ribs.

In particular, the reinforcing ribs are preferably directionally printed to increase strength in the radial direction, which corresponds to a direction parallel to the longitudinal direction of the rotor blade aerofoils, where the aerofoil centrifugal load and bending moment reactions are the highest.

Also advantageously, a plurality of reinforcing ribs provided independently from each other prevent continuous crack propagation across the blisk body, in case one defect originates in a single reinforcing rib. It thus prevents an undesirable risk of release of high energy debris.

In a particular embodiment, the portion of a rotor blade comprises a first reinforcing circumferential rib disposed in a cross sectional plane perpendicular to a radial direction of the bladed rotor wheel,
- the portion of a forged rotor disk comprises a second reinforcing circumferential rib disposed in a cross sectional plane perpendicular to a radial direction of the bladed rotor wheel, and
- the at least one reinforcing rib comprised in the joining structure is disposed between the first circumferential rib and the second circumferential rib.

In a preferred embodiment, the radial reinforcing ribs located between two circumferential ribs are provided with a higher thermal expansion coefficient than the portion of a cast rotor blade and the portion of a forged disk.

Advantageously, the reinforcing ribs with higher thermal expansion coefficient than the blade and disc, expands more than the blade and disc during service operation. The circumferential ribs prevents the radial growth of the reinforcing radial ribs, creating compressive loads in the reinforcing ribs. These compressive loads can reduce or cancel the tensile loads created by the aerofoil CF and bending moments. This improves the strength of the reinforcing ribs and thus of the bulk of the joining structure.

In a particular embodiment, the joining structure comprises a seal labyrinth structure, the seal labyrinth structure comprising a plurality of fins configured for projecting from the joining structure and for abutting a portion of a stator vane.

The seal labyrinth structure provided directly by additive manufacturing along with the joining structure is in the form of a plurality of elements such as fins, which rub against the lower portion of a respective stator vane assembly of the corresponding turbine stage.

Advantageously, the seal labyrinth structure provides a complex path for the flow of working fluid between different stages of the turbine through the gap between the rotating and static parts. Therefore, leakage between stages is prevented.

In a particular embodiment, the portion of a rotor blade is covered by a thermal barrier coating and/or the joining structure is covered by a thermal barrier coating.

In a particular embodiment, the joining structure comprises an internal volume provided with a lattice structure.

Advantageously, the provision of a lattice structure provides a failsafe mode for the printed joining structure. This is, in the event of a crack starting from a defect within the joining structure, the bladed rotor wheel of the disclosure provided with such lattice structure is less prone to material failure, since the lattice structure is inherently crack tolerant.

In a preferred embodiment, the lattice structure has a variable density, such that the density of the lattice structure is higher in areas closer to the boundaries of the internal volume.

In particular, said density is higher in areas closer to any wall from which it extends. On the other side, the lattice structure has reduced density as the distance away from the wall increases. Preferably, the density of the lattice structure is defined to be higher at predetermined high stress locations, where the lattice is more likely to experience high loads and stresses.

In a preferred embodiment, the lattice structure bridges the interface where the bottom surface of the portion of a rotor blade abuts the rim portion of the portion of a forged rotor disk, such that a bridge structure is defined between the joining structure and said interface, wherein said bridge structure comprises a first end and a second end, wherein the following distances are defined:
- a first distance (H1) defined as the distance between said first end and said second end in the radial direction,
- a second distance (H2) defined as the distance between said interface and the joining structure in the axial direction.

The radial direction shall be understood as a direction parallel to the longitudinal direction of the rotor blade aerofoils.

The axial direction shall be understood as a direction parallel to the direction of the rotor axis.

The interface where the bottom surface of the portion of a rotor blade abuts the rim portion of the portion of a forged rotor disk can be subjected to micro-displacements during service operation. The bridge structure creates an elastic means, which compensates micro-displacements. The bridge structure prevents the direct adhesion of the joining structure to a geometrical discontinuity at said blade and disc interface, which could induce micro-slips and initiate shear rupture of the joining structure.

In a preferred embodiment, the lattice structure bridges said interface [blade-disc] by a distance H1 of at least 5 mm and a distance H2 of at least 2.5 mm., local flexibility being provided by this configuration.

In a second inventive aspect, the disclosure also provides an aero-engine turbine comprising a plurality of bladed rotor wheels according to any of the embodiments of the first inventive aspect.

DESCRIPTION OF THE DRAWINGS

These and other characteristics and advantages of the disclosure will become clearly understood in view of the detailed description of the disclosure which becomes apparent from a preferred embodiment of the disclosure, given just as an example and not being limited thereto, with reference to the drawings.

DETAILED DESCRIPTION

Once the object of the disclosure has been outlined, specific non-limitative embodiments are described hereinafter. The skilled person should recognize that aspects described herein may be embodied as a bladed rotor wheel of an aero-engine turbine stage, an aero-engine turbine comprising a plurality of bladed rotor wheels according to the disclosure, or even an aircraft comprising such aero-engine turbine.

Figure 1:
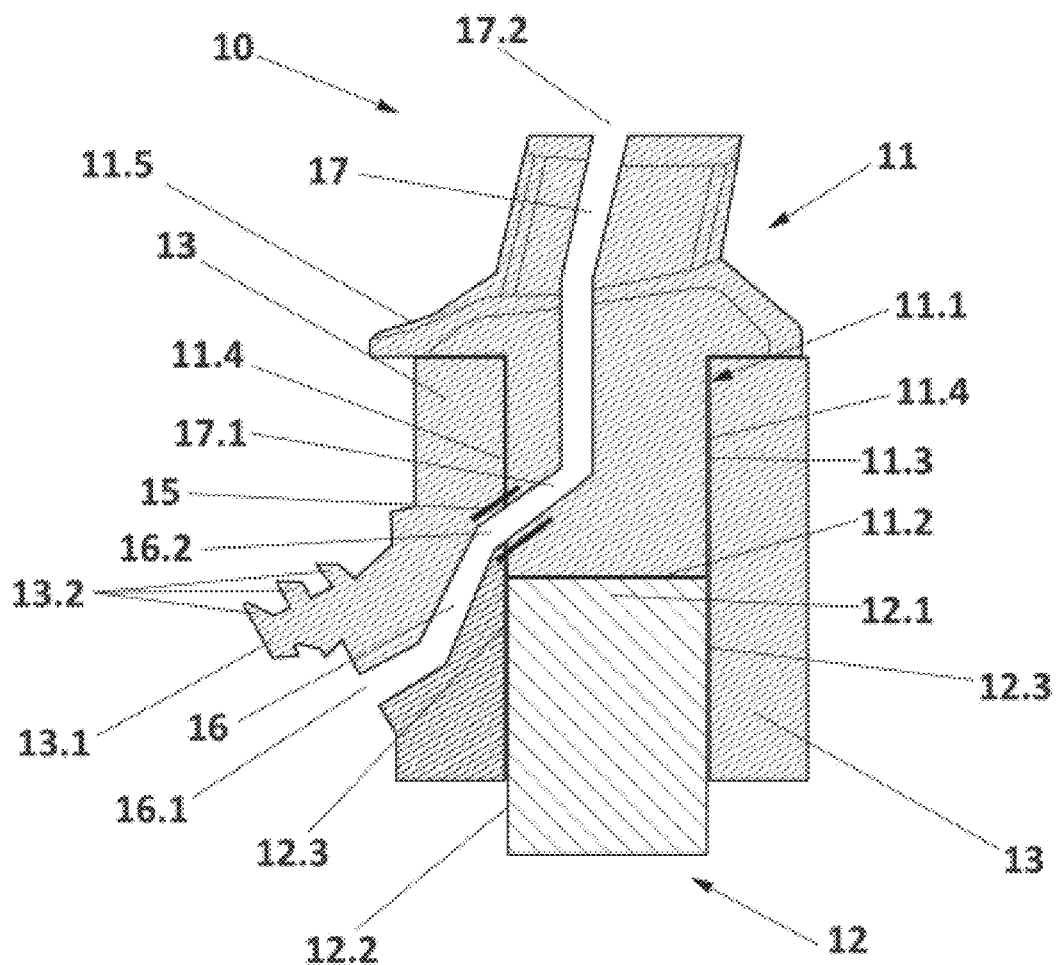
FIG. 1 This figure shows representation of a cross-sectional view of a bladed rotor wheel of an aero-engine turbine stage comprising a portion of a rotor blade and a portion of a forged rotor disk integrally merged by means of a joining structure.

FIG. 1 shows a representation of a portion (11) of a rotor blade and a portion (12) of a forged rotor disk integrally merged by means of a joining structure (13), in a bladed rotor wheel (10) of an aero-engine turbine (20) stage according to the disclosure. The joining structure (13) arrangement is shown at both the front face and back face of the portion (12) of a forged rotor disk. The characteristics of the joining structure (13) are the same at the front face and back face of the portion (12) of a forged rotor disk.

In particular, the portion (11) of a rotor blade is part of a blade casted as a single crystal alloy, due to its good creep strength resulting from the absence of grain boundaries. Said portion (11) of a rotor blade comprises a shank portion (11.1) which, in turn, has a bottom surface (11.2).

In turn, the disk is made from a forged pancake. Hence, the portion (12) of a forged rotor disk has very good strength, fatigue and damage tolerance properties, with a very low probability of having a material defect. Said portion (12) of a forged rotor disk comprises a rim portion (12.1) and an outer surface (12.2).

Said shank portion (11.1) is configured for coupling with both the forged disk and the joining structure (13). In particular, the bottom surface (11.2) is cylindrical, and is shown contacting the rim portion (12.1) of the portion (12) of the rotor disk, which also has a cylindrical shape, so as to maximize contact, and allow the two contacting components to bear the high moment loads in the blade generated by the difference of pressure on the convex and concave sides of the aerofoil.

Both the portion (11) of a rotor blade and the portion (12) of a forged disk are integrally merged by means of the joining structure (13). Said joining structure (13) has been provided by an additive manufacturing process for providing structural continuity, being printed respectively on the shank portion (11.1) of the blade and on the outer surface (12.2) of the disk.

Said joining structure (13) provided by an additive manufacturing process on the cited surfaces of both the blade and the disk, prevents the appearance of gaps which otherwise would lead to leakages and losses.

In particular, the joining interface (11.4) formed between the joining structure (13) and the portion (11) of a rotor blade, and the joining interface (12.3) formed between the joining structure (13) and the portion (12) of a forged rotor disk, are both shown comprised in a plane whose normal direction is parallel to the axis of the forged rotor disk. Accordingly, both joining interfaces (11.4, 12.3) will undergo shear stresses rather than tensile stresses in the main load transfer areas. It thus prevents decohesive stresses and the propagation of material defects.

Additionally, the figure shows an internal duct configured for conveying compressed air bled from the compressor for cooling the blades. This is, said internal duct acts as a cooling channel for providing compressed air to the shank portion (11.1) of the blade, so that said compressed air is distributed upstream of the shank portion (11.1) through internal cooling channels to the rest of the blade.

For this purpose, the internal duct depicted is formed by two different complementary sections. In particular, the figure shows a first cooling channel (16) shaped in the joining structure (13), said first cooling channel (16) comprising an inlet (16.1) for receiving compressed air bled from the compressor, and an outlet (16.2) configured for establishing a fluidic communication with the inlet (17.1) of the second cooling channel (16). In this sense, the portion (11) of a rotor blade comprises said second cooling channel (17) shaped therein, said second cooling channel (17) comprising the cited inlet (17.1) and an outlet (17.2) which communicates the compressed air upstream of the shank portion (11.1).

Further, FIG. 1 shows one plug component (15) at the joining interface (11.4, 12.3).

The plug component (15) is positioned at the inlet (17.1) of the second cooling channel (17) shaped in the portion (11) of the rotor blade portion and protrudes from the outer surface (11.3) of the shank portion (11.1) of the blade. Advantageously, the plug component (15) provides the 3D printing build-up process with better guidance and stabilization around the inlet (17.1) of the second cooling channel (17) shaped in the portion (11) of a rotor blade.

Additionally, FIG. 1 shows a seal labyrinth structure (13.1), shaped as three fins (13.2) which are depicted projecting from the joining structure (13). Those fins (13.2) are provided directly by additive manufacturing along with the joining structure (13) and are configured for abutting a portion (100) of a stator vane of the corresponding aero-engine turbine (20) stage.

Finally, FIG. 1 shows a platform portion (11.5) provided by an additive manufacturing process. Said platform portion (11.5) is shaped as a wall which extends from the shank portion (11.1) for abutting a respective adjacent platform portion (11.5) of a contiguous rotor blade.

Figure 2:
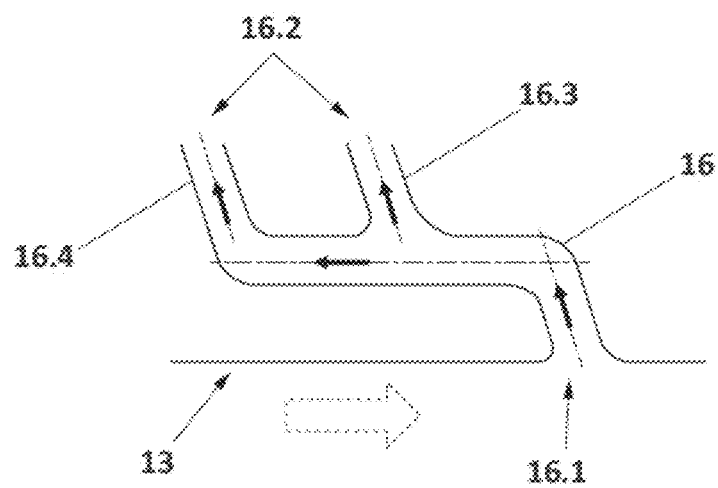
FIG. 2 This figure shows a schematic layout of the first cooling channel shaped in the joining structure of the bladed rotor wheel according to the disclosure.

FIG. 2 shows a schematic cross-sectional view of a 3D-printed joining structure (13) resulting from cutting said joining structure (13) by a plane tangent to a circumferential direction of a bladed rotor wheel (10) according to the disclosure.

In particular, the figure represents a particular layout of the first cooling channel (16) shaped during the 3D-printing process of the joining structure (13). An inlet (16.1) is located at the front face of the joining structure (13), which is represented by the bottom line in the figure. Said front face of the joining structure (13) is comprised in a plane parallel to the plane containing the faces of the rotor disk.

Compressed air bled upstream of the aero-engine turbine (20) is fed to the inlet (16.1) for cooling the rotor blades of the bladed rotor wheel (10). Then, said compressed air (i.e., cooling air) is channeled downstream, following the direction of the arrows depicted, through the first cooling channel (16), which is shaped as a main channel (16) from which two cooling sub-channels (16.3, 16.4), extend, each of them channeling the cooling air through each respective outlet (16.2) and into the second cooling channel (17) through the inlet (17.1) of the second cooling channel (17), and then towards the outlet (17.2) of the second cooling channel (17) of the portion (11) of a rotor blade.

According to this particular configuration of a first cooling channel (16) divided into two cooling sub-channels (16.3, 16.4), a single inlet (16.1) can be used to feed several distinct blades. Both sub-channels (16.3, 16.4) are positioned in the same circumferential direction with respect to the inlet (16.1). Said circumferential direction is defined by the rotor rotation direction, which is represented by the dashed arrow. Advantageously, the provision of the sub-channels (16.3, 16.4) oriented according rotor rotation direction helps the feed of the cooling sub-channels (16.3, 16.4) by preventing higher flow resistance in a sub-channel (16.3, 16.4) relatively to the other.

Figure 3:
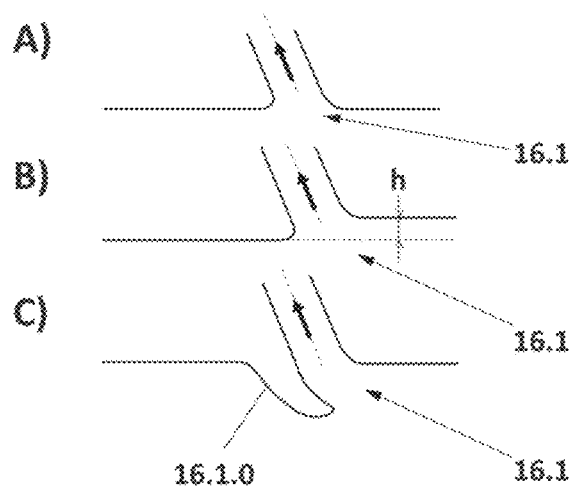
FIG. 3 This figure shows different schematic layouts of the inlet of the first cooling channel shaped in the joining structure.

FIG. 3 depicts schematically three different layouts (A), B), C)) of the inlet (16.1) of the first cooling channel (16) shaped during the 3D printing process of the joining structure (13). The three configurations shown help to guide the stream of cooling air through the inlet (16.1) and into the first cooling channel (16) by modifying the shape of the inlet (16.1). The resultant geometry of the inlet (16.1) increases the grip of the cooling air to the cooling channel (16), improving in turn the feeding process of the cooling air downstream, following the direction of the arrows depicted.

In particular, the layout shown in FIG. 3.A) comprises an inlet (16.1) with a hole angled relatively to the bladed rotor wheel (10) rotation direction.

The layout shown in FIG. 3.B) comprises a stepped discontinuity of the joining structure (13) proximal surfaces surrounding the inlet (16.1). In particular, said discontinuity is represented as the height difference (h) between the prolongations of both lateral surfaces of the joining structure (13) at each side of the inlet (16.1)

The layout shown in FIG. 3.C) comprises a curved protrusion (16.1.0) in the form of an aerodynamic guide vane.

Figure 4:
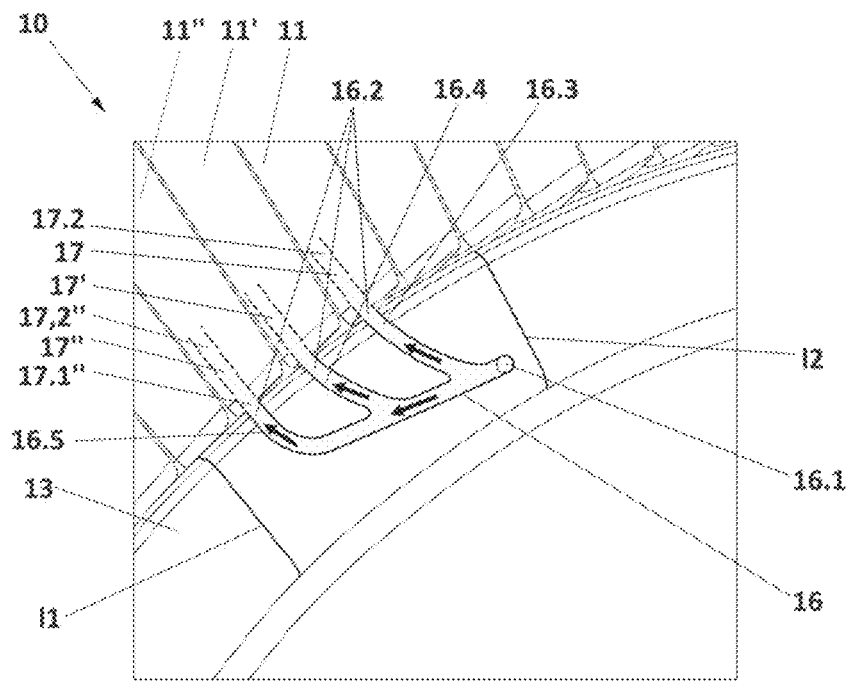
FIG. 4 This figure shows a cross-sectional view of a portion of a bladed rotor wheel of an aero-engine turbine stage according to the disclosure, wherein a schematic representation of the first internal cooling channel is depicted.

FIG. 4 shows an enlarged portion of the bladed rotor wheel (10) of the disclosure. The portion of the bladed rotor wheel (10) comprises several portions (11, 11', 11") of a plurality of rotor blades and a portion (12) of a forged rotor disk, said portions (11, 11', 11") of a plurality of rotor blades and the portion (12) of a forged rotor disk being integrally merged by means of a joining structure (13).

A sector of the joining structure (13) has been delimited by two continuous lines (11, 12). Said delimited sector of the joining structure (13) comprises an inlet (16.1) which is fed with compressed air bled upstream of the aero-engine turbine (20). Then, said compressed air (i.e., cooling air) is fed into the internal first cooling channel (16) shaped in the joining structure (13) during the 3D printing process, which is represented with continuous lines superimposed on the joining structure (13).

After being fed through the inlet (16.1), the cooling air is channeled downstream, following the direction of the arrows depicted. This is, into the first cooling channel (16) which is then divided into three different cooling sub-channels (16.3, 16.4, 16.5), each of them feeding three respective cooling channels (17, 17', 17") shaped in the portions (11, 11', 11") of rotor blades by the casting process, which are represented with dashed lines superimposed on the portions (11, 11', 11") of the respective rotor blades. The cooling air on the portions (11, 11', 11") of rotor blades side is fed through the inlets (17.1, 17.1', 17.1") and then channeled through the outlet downstream (17.2, 17.2', 17.2") to the whole rotor blades.

In a more particular example of the embodiment depicted in FIG. 4, the first cooling channel (16) extending through the inlet (16.1) into the joining structure (13) is shaped during the 3D printing process at an oblique angle to the front face of the joining structure (13), this is, to the plane containing the faces of the rotor disk.

In a more particular example, the first cooling channel (16) is shaped rotated by a 30 degree angle in the circumferential plane.

Figure 5:
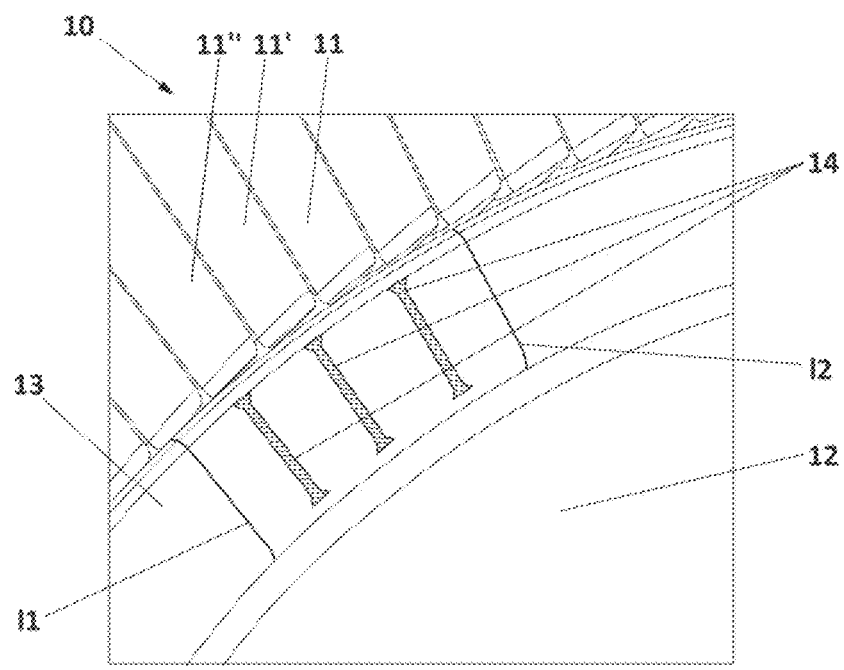
FIG. 5 This figure shows a cross-sectional view of a portion of a bladed rotor wheel of an aero-engine turbine stage according to the disclosure, wherein the joining structure comprises several radial reinforcing ribs.
Figure 6:
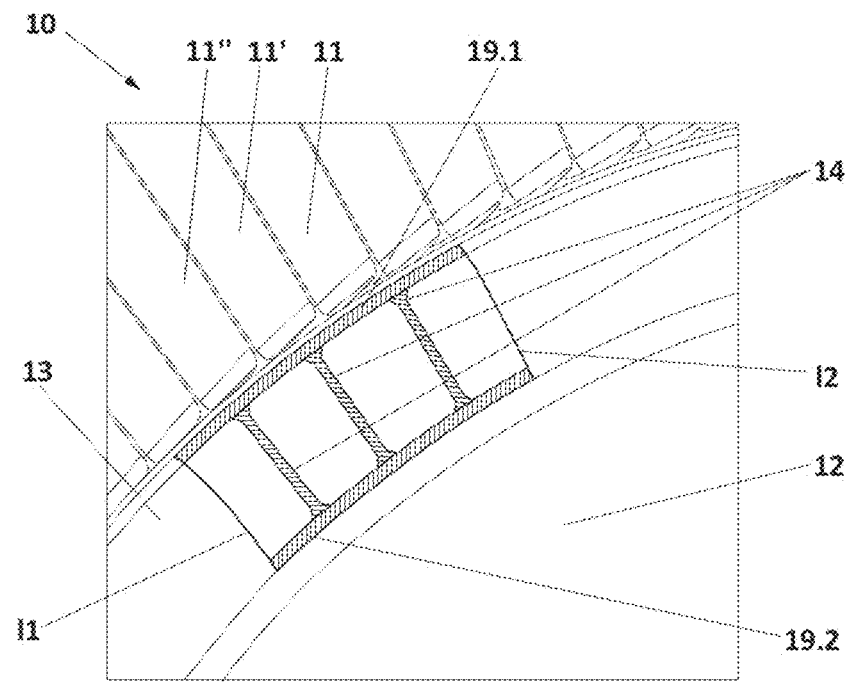
FIG. 6 This figure shows a particular embodiment of the bladed rotor wheel illustrated in FIG. 5, wherein the joining structure further comprises two circumferential ribs.

FIGS. 5 and 6 show an enlarged portion of the bladed rotor wheel (10) of the disclosure. Both figures depict several portions (11, 11', 11") of a plurality of rotor blades and a portion (12) of a forged rotor disk, said portions (11, 11', 11") of a plurality of rotor blades and the portion (12) of a forged rotor disk being integrally merged by means of a joining structure (13).

In particular, a sector of the joining structure (13) depicted in FIG. 5 has been delimited by two continuous lines (I1, I2). Said delimited sector of the joining structure (13) comprises three reinforcing ribs (14) provided directly on the joining structure (13) by an additive manufacturing process. The three reinforcing ribs (14) act as independent structural members disposed in the radial direction, thus providing the joining structure (13) with increased radial load capability. This way, when the aerofoil of the blade portion is subjected to centrifugal and bending loads, the reinforcing ribs (14) bears tensile or compressive loads.

In turn, in the particular embodiment depicted in FIG. 6, the three reinforcing ribs (14) of FIG. 5 are located between a first reinforcing circumferential rib (19.1) and a second circumferential rib (19.2). Reinforcing circumferential ribs (19.1, 19.2) are provided on the blade portions (11, 11', 11") and disc portion (12) and, upon relative changes in the dimensions of the joining structure (13) and the rest of the elements in the bladed rotor wheel (10), due to differential thermal expansion, said reinforcing circumferential ribs (19.1, 19.2) generate compressive loads in the radial reinforcing ribs (14), and therefore provide the joining structure (13) with increased strength.

Figure 7:
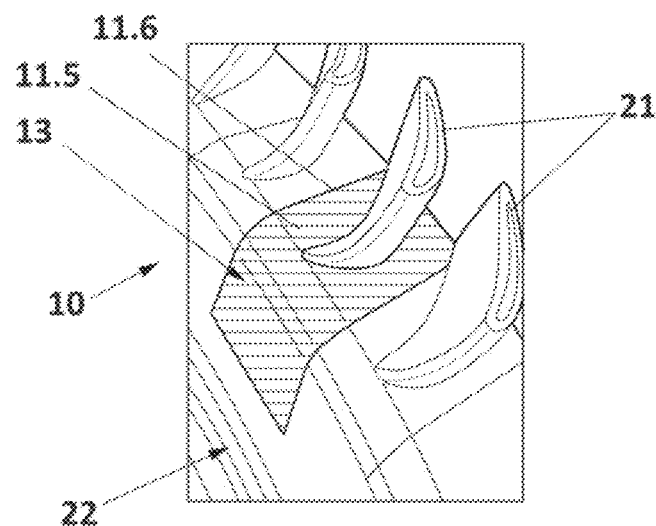
FIG. 7 This figure shows a portion of an arrangement of a bladed rotor wheel according to the disclosure, where the joining structures and the aerofoil platforms shown are 3D-printed.

FIG. 7 shows an arrangement of a bladed rotor wheel (10) of an aero-engine turbine (20) stage according to the disclosure, where a plurality of rotor blades (21) are integrally merged with a rotor disk (22) by means of a plurality of respective joining structures (13) provided by an additive manufacturing process. Only the longitudinal part of the aerofoil is cast with single crystal or directionally solidified casting. In particular, a sector of the arrangement has been highlighted with oblique lines to clearly show an aerofoil platform (11.5) which has been 3D-printed.

As it can be seen, the 3D-printed platforms (11.5) are depicted as walls, which extend to each side from the lower section of the blade aerofoil, so as to abut respective adjacent platforms of contiguous rotor blades (21). Additionally, the 3D-printed platforms (11.5) have been provided with a joint (11.6) configured for engaging with an adjacent joint (11.6) provided in the platform (11.5) of a contiguous rotor blade (21). As a result, the plurality of platforms (11.5) complete the annular shape of a turbine rotor arrangement and define the lower interface of the turbine (20) main gas path.

Figure 8:
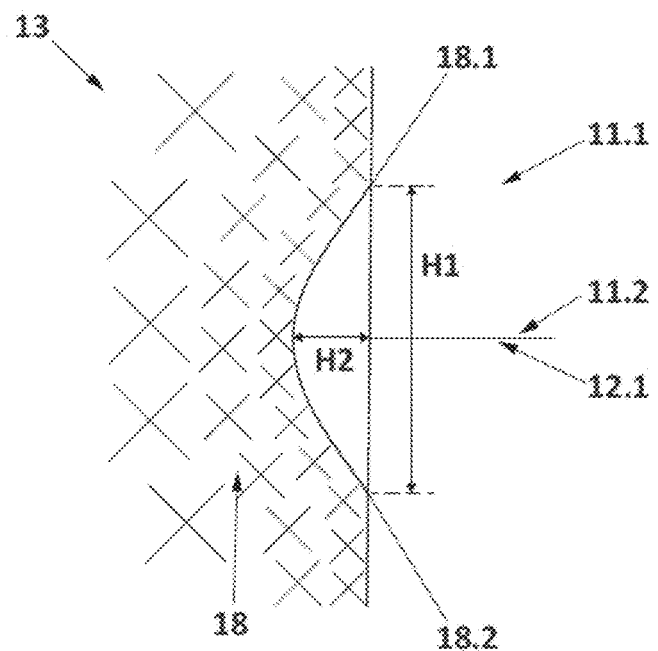
FIG. 8 This figure shows a cross-sectional local view of a portion of a bladed rotor wheel of an aero-engine turbine stage according to the disclosure, wherein a lattice of variable density, bridging the [blade-disc] interface, is depicted.

FIG. 8 shows a joining structure (13) provided with a lattice structure (18), which is depicted as a texture of crosses with different sizes. The density of the lattice structure (18) increases at proximity to the blade (21) and disk (22) bodies, more in particular, at proximity of the shank portion (11.1) and the rim portion (12.1).

Said variable density is depicted as an increase in the number of accumulated crosses. The lattice structure (18) creates a bridge structure bypassing the [blade-disk] interface, this is, the interface where the bottom surface (11.2) of the portion (11) of a rotor blade abuts the rim portion (12.1) of the portion (12) of a forged rotor disk. This interface can be subjected to micro-displacements. It could induce rupture of the joining structure (13), should it be bonded directly to the interface. The bridge structure shown creates an elastic structure, which accommodates any residual micro-displacements.

In the present configuration, the bridge structure created by the lattice structure (18) comprises a first end (18.1) and a second end (18.2), wherein a first distance (H1) is defined as the distance between said first end (18.1) and said second end (18.2) in the radial direction. A second distance (H2) is defined as the axial distance between the bridge structure and said [blade-disc] interface. In the particular configuration shown, said distance (H1) has a value of 5 mm and said second distance (H2) has a value of 2.5 mm, which provides local flexibility.

Figure 9:
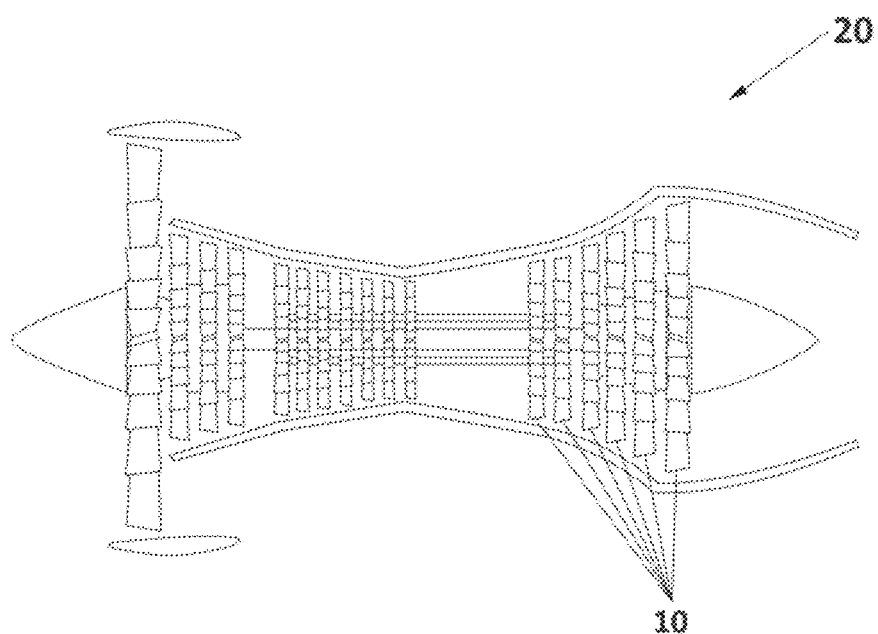
FIG. 9 This figure shows an aero-engine turbine comprising a plurality of bladed rotor wheels according to an embodiment of the present disclosure.

FIG. 9 depicts an aero-engine turbine (20) comprising a plurality of bladed rotor wheels (10) according to the disclosure.

What is claimed is:

1. A bladed rotor wheel of an aero-engine turbine stage, the bladed rotor wheel comprising:
a portion of a rotor blade provided by a casting process as a single crystal alloy or made from a directionally solidified alloy, the portion of a rotor blade comprising a shank portion and a bottom surface;
a portion of a forged rotor disk, said portion of a forged rotor disk comprising a rim portion and an outer surface; and
a joining structure provided by an additive manufacturing process and configured for integrally merging the portion of a rotor blade with the portion of a forged rotor disk,
wherein the bottom surface of the portion of a rotor blade abuts the rim portion of the portion of a forged rotor disk,
wherein the joining structure is merged with:
an outer surface of the shank portion, the joining structure and the shank portion to provide structural continuity through a joining interface formed between the joining structure and the portion of a rotor blade, and
the outer surface of the portion of a forged rotor disk to provide structural continuity through a joining interface formed between the joining structure and the portion of a forged rotor disk,
wherein the joining structure comprises a first cooling channel shaped therein by the additive manufacturing process, said first cooling channel comprising an inlet and an outlet,
wherein the portion of a rotor blade comprises a second cooling channel shaped therein by the casting process, said second cooling channel comprising an inlet and an outlet, and
wherein the first cooling channel and the second cooling channel are complementary, such that when the joining structure is merged with the outer surface of the shank portion, the outlet of the first cooling channel matches with the inlet of the second cooling channel to provide fluidic communication between the first cooling channel and the second cooling channel through the joining interface.

2. The bladed rotor wheel according to claim 1, further comprising a second portion of a rotor blade provided by a casting process as a single crystal alloy or made from a directionally solidified alloy, said second portion of a rotor blade comprising a third cooling channel shaped therein by the casting process, wherein the third cooling channel comprises an inlet and an outlet, wherein the first cooling channel is divided downstream of the inlet into at least two cooling sub-channels, each of said cooling sub-channels comprising a respective outlet, one being configured for matching with the inlet of the second cooling channel, and the other being configured for matching with the inlet of the third cooling channel, and wherein axes of the sub-channels are positioned relatively to a respective axis of the inlet, in a same rotor circumferential direction.

3. The bladed rotor wheel according to claim 1, wherein the inlet of the first cooling channel is provided with at least one geometric element configured for increasing the grip of cooling air flowing inwards, the at least one geometric element comprising:

a hole angled with respect to a rotation direction of the bladed rotor wheel;
a stepped discontinuity of the proximal surfaces of the joining structure surrounding the inlet; or
a curved protrusion, preferably in the form of an aerodynamic guide vane.

4. The bladed rotor wheel according to claim 1, wherein the material used for manufacturing the joining structure by the additive manufacturing process has lower tensile strength than:
the material used for manufacturing the portion of a rotor bade by casting; and
the material used for manufacturing the portion of a forged rotor disk.

5. The bladed rotor wheel according to claim 1, wherein at least one of:
the joining interface formed between the joining structure and the portion of a rotor blade, or
the joining interface formed between the joining structure and the portion of a forged rotor disk,
is comprised in a plane whose normal direction is parallel to an axis of the forged rotor disk.

6. The bladed rotor wheel according to claim 1, wherein at least one of:
the thickness of the portion of the joining structure merged with the portion of a rotor blade through the joining interface, or
the thickness of the portion of the joining structure merged with the portion of a forged rotor disk through the joining interface,
is less than 10 mm.

7. The bladed rotor wheel according to claim 1, wherein the portion of a rotor blade further comprises a platform portion provided by an additive manufacturing process.

8. The bladed rotor wheel according to claim 7, wherein the platform portion comprises a joint configured for engaging with an adjacent joint comprised in a platform portion of an adjacent rotor blade, the joint being provided by an additive manufacturing process.

9. The bladed rotor wheel according to claim 1, wherein the outer surface of the shank portion comprises a positioning means for the additive manufacturing build-up process of the joining structure, the positioning means comprising at least one of the following:
a protrusion cast with the portion of a rotor blade,
a protrusion provided onto the portion of a rotor blade by an additive manufacturing process, or
a plug component added to the casting of the portion of a rotor blade, the plug protruding from the outer surface of the shank portion.

10. The bladed rotor wheel according to claim 1, wherein the joining structure comprises at least one reinforcing rib provided by an additive manufacturing process, the at least one reinforcing rib being disposed along a radial direction of the bladed rotor wheel.

11. The bladed rotor wheel according to claim 10,
wherein the portion of a rotor blade comprises a first reinforcing circumferential rib disposed in a cross sectional plane perpendicular to a radial direction of the bladed rotor wheel, the portion of a forged rotor disk comprises a second reinforcing circumferential rib disposed in a cross sectional plane perpendicular to a radial direction of the bladed rotor wheel, and
wherein the at least one radial reinforcing rib comprised in the joining structure is disposed between the first circumferential rib and the second circumferential rib.

12. The bladed rotor wheel according to claim 1, wherein the joining structure comprises a seal labyrinth structure, the seal labyrinth structure comprising a plurality of fins configured for projecting from the joining structure and for abutting a portion of a stator vane.

13. The bladed rotor wheel according to claim 1, wherein the portion of a rotor blade is covered by a thermal barrier coating and/or the joining structure is covered by a thermal barrier coating.

14. The bladed rotor wheel according to claim 1,
wherein the joining structure comprises an internal volume provided with a lattice structure having a variable density, such that the density of the lattice structure is higher in areas closer to boundaries of the internal volume,
wherein the lattice structure bridges the interface where the bottom surface of the portion of a rotor blade abuts the rim portion of the portion of a forged rotor disk, such that a bridge structure is defined between the joining structure and said interface,
wherein said bridge structure comprises a first end and a second end,
wherein the following distances are defined:
a first distance defined as the distance between said first end and said second end in a radial direction, said first distance having a value of at least 5 mm, and
a second distance defined as the distance between said interface and the joining structure in an axial direction, said second distance having a value of at least 2.5 mm.

15. An aero-engine turbine comprising a plurality of bladed rotor wheels according to claim 1.

16. The bladed rotor wheel according to claim 1, wherein the inlet of the first cooling channel is provided with at least one geometric element configured for increasing the grip of cooling air flowing inwards, the at least one geometric element comprising a hole angled with respect to a rotation direction of the bladed rotor wheel.

* * * * *